(12) United States Patent
Yasugi

(10) Patent No.: US 8,355,824 B2
(45) Date of Patent: Jan. 15, 2013

(54) WIND TURBINE GENERATOR AND METHOD OF CONTROLLING THE SAME

(75) Inventor: Akira Yasugi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 95 days.

(21) Appl. No.: 12/601,565

(22) PCT Filed: May 20, 2009

(86) PCT No.: PCT/JP2009/059261
§ 371 (c)(1),
(2), (4) Date: Nov. 24, 2009

(87) PCT Pub. No.: WO2010/134171
PCT Pub. Date: Nov. 25, 2010

(65) Prior Publication Data
US 2011/0074152 A1   Mar. 31, 2011

(51) Int. Cl.
*G05D 5/00* (2006.01)
(52) U.S. Cl. .............. 700/287; 700/9; 700/33; 700/297; 290/44
(58) Field of Classification Search ........... 290/44; 307/59, 62; 700/9, 33, 286, 287, 291, 292, 700/295, 297
See application file for complete search history.

(56) References Cited

U.S. PATENT DOCUMENTS

| | | | | |
|---|---|---|---|---|
| 4,613,762 A | * | 9/1986 | Soderholm | 290/44 |
| 7,345,373 B2 | * | 3/2008 | Delmerico et al. | 290/44 |
| 2006/0273595 A1 | * | 12/2006 | Avagliano et al. | 290/44 |
| 2008/0179887 A1 | * | 7/2008 | Kawazoe et al. | 290/44 |

FOREIGN PATENT DOCUMENTS

| | | |
|---|---|---|
| JP | 200244867 A | 2/2002 |
| JP | 2004260929 A1 | 9/2004 |
| JP | 2006271199 A | 10/2006 |
| JP | 2007089399 A | 4/2007 |
| JP | 2007231778 A1 | 9/2007 |
| JP | 2007330017 A1 | 12/2007 |
| JP | 2008011607 A1 | 1/2008 |
| JP | 2009027766 A | 2/2009 |
| JP | 2009068379 A | 4/2009 |
| JP | 2008211912 A | 9/2009 |

OTHER PUBLICATIONS

ISR for PCT/JP2009/059261 dated May 20, 2009.
Notice of Reasons for Rejection for JP2009-548926 mailed Mar. 6, 2012.
Decision to Grant, issued by the Japanese Patent Office on Nov. 13, 2012, in corresponding Japanese Application No. 2009-548926.

* cited by examiner

*Primary Examiner* — Sean Shechtman
(74) *Attorney, Agent, or Firm* — Kanesaka Berner & Partners

(57) ABSTRACT

In a case where a request for changing a maximum value of active power and a newly defined maximum value of active power are received from the utility grid side, a maximum value of an active power demand value set to a rated value is changed to the newly defined maximum value of active power at a predetermined change rate or less.

10 Claims, 2 Drawing Sheets

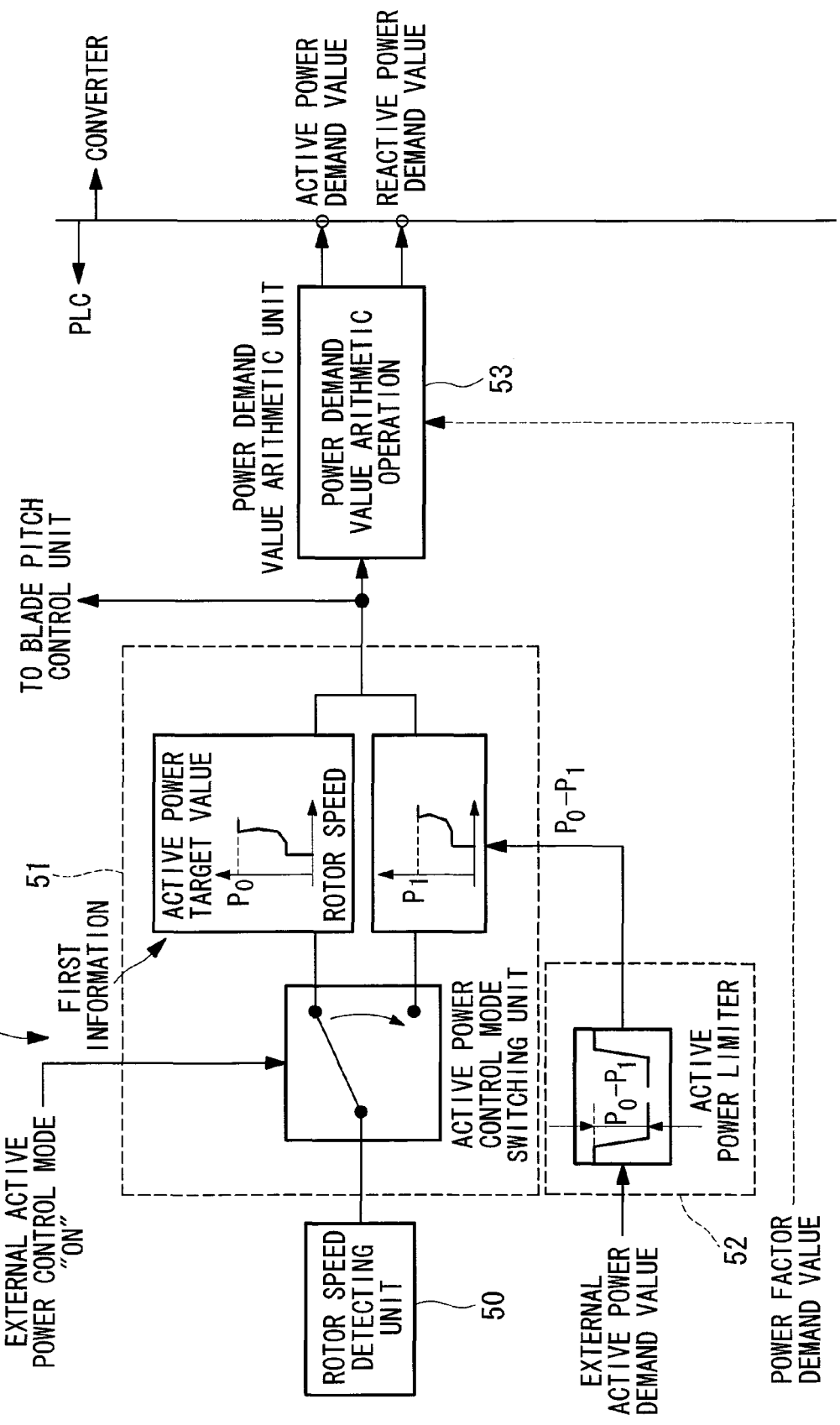

WIND TURBINE GENERATOR AND METHOD OF CONTROLLING THE SAME

RELATED APPLICATIONS

The present application is a National Phase of, and claims priority from, International Application Number PCT/JP2009/059261, filed May 20, 2009, the disclosure of which is hereby incorporated by reference herein in its entirety.

TECHNICAL FIELD

The present invention relates to a wind turbine generator and a method of controlling the same.

BACKGROUND ART

Conventionally, in such a wind turbine generator for performing interconnected operation together with a utility grid, by controlling the rotational speed of a rotor and excitation current of the rotor, active power and reactive power are controlled, and the active and reactive powers are supplied to the utility grid.

Patent citation 1 discloses a technique for detecting a frequency of a utility grid, determining an active power demand value so that a grid frequency is equal to a predetermined value, and controlling the active power based on the active power demand value.

Patent Citation 1: Japanese Unexamined Patent Application, Publication No. 2002-44867

DISCLOSURE OF INVENTION

However, when fluctuation in the rotational speed of the rotor is large, in association with the fluctuation, the active power also largely fluctuates. Thus, for example, even in a case where an active power amount per unit time required by the utility grid side is small, the fluctuation in the rotational speed of the rotor is large, so that the active power cannot be adjusted to a desired value. An excessive active power is supplied to the utility grid in response to the request, thereby causing a problem that an adverse influence is exerted on stability of the utility grid such as fluctuations in voltage or frequency.

The present invention has been achieved to solve the above problem, and it is an object thereof to provide a wind turbine generator capable of supplying active power according to a request of a utility grid, as well as a method of controlling the same.

A first mode of the present invention relates to a wind turbine generator, wherein in a case where a request for changing a maximum value of active power and a newly defined maximum value of active power are received from a utility grid side, a maximum value of an active power demand value set to a rated value is changed to the newly defined maximum value of active power at a predetermined change rate or less.

With such a configuration, in the case where the request for changing the maximum value of active power and the newly defined maximum value of active power are received from the utility grid side, the maximum value of the active power demand value, which is set to the rated value, is changed to the newly defined maximum value of active power at the predetermined change rate or less.

Since the maximum value of active power is changed at the predetermined rate or less, for example, by setting the predetermined rate to a change rate at which fluctuations in the voltage value or frequency fluctuations of the utility grid are suppressed to a predetermined value or less, a rapid change in the maximum value of the active power demand value set to the rated value can be prevented, and the frequency fluctuations or power fluctuations of the utility grid can be suppressed to a predetermined value or less. Examples of the operation state parameter include a rotor rotational speed, an excitation current of the rotor, and the like.

The wind turbine generator may include: a detecting unit for detecting a parameter related to an operation state; a demand value obtaining unit for storing first information in which the parameter related to the operation state and an active power demand value are associated with each other, and obtaining an active power demand value corresponding to the operation state parameter detected by the detecting unit based on the first information; and a changing unit for changing, in a case where a request for changing a maximum value of active power and a newly defined maximum value of active power are received from the utility grid side, a maximum value of an active power demand value in the first information, which is set to a rated value, to the newly defined maximum value of active power at the predetermined change rate or less.

With such a configuration, the first information in which a parameter related to an operation state and an active power demand value are associated with each other is held in the demand value obtaining unit. The active power demand value corresponding to the operation state parameter is read from the first information by the demand value obtaining unit. Based on the read active power demand value, the active power is controlled. In the case where a request for changing a maximum value of active power and a newly defined maximum value of active power are received from the utility grid side, the maximum value of the active power demand value in the first information, which is set to the rated value, is changed to the newly defined maximum value of active power at the predetermined change rate or less.

The changing unit in the wind turbine generator may calculate the change rate by dividing a difference between the active power demand value set to the rated value and the newly defined maximum value of active power by predetermined time required for the change, and employs the calculated change rate in a case where the calculated change rate is equal to or less than the predetermined change rate, while employing the predetermined change rate in a case where the calculated change rate exceeds the predetermined change rate preliminarily set.

By determining the change rate as described above, the active power demand value set to the rated value can be gently changed. As a result, in a period in which the first information is being changed, active power can be prevented from sharply changing, and the influence on the utility grid of the change in the maximum value of active power can be reduced.

The wind turbine generator may further include a plurality of pieces of second information in which a parameter related to an operation state and an active power demand value are associated with each other and maximum values of the active power demand values are different from each other, for changing, in a case where a request for changing a maximum value of active power and a newly defined maximum value of active power are received from the utility grid side, an active power demand value set to a rated value step by step by using the second information in which the maximum value of the active power demand value is between the rated active power value and the maximum value of active power newly defined.

Since the maximum value of active power is changed by using the plurality of pieces of second information held in the changing unit as described above, the active power demand value set to the rated value can be promptly changed. Since the active power demand value set to the rated value is changed step by step to the newly defined maximum value of active power in response to the request for changing the maximum value of active power, for example, by providing a large number of pieces of second information so as to suppress fluctuations in the voltage value or frequency fluctuations of the utility grid to a predetermined value or less, a sharp change in the active power demand value can be prevented, and the frequency fluctuations or power fluctuations of the utility grid can be suppressed to a predetermined value or less. Examples of the operation state parameter include the rotor rotational speed, the excitation current of the rotor, and the like.

A second mode of the present invention relates to a wind farm including a plurality of wind turbine generators, wherein at least one of the plurality of wind turbine generators is the wind turbine generator described above.

A third mode of the present invention relates to a method of controlling a wind turbine generator, wherein in a case where a request for changing a maximum value of active power and a newly defined maximum value of active power are received from a utility grid side, a maximum value of an active power demand value, which is set to a rated value, is changed to the newly defined maximum value of active power at a predetermined change rate or less.

A fourth mode of the present invention relates to a method of controlling a wind farm having a plurality of wind turbine generators, wherein the method of controlling a wind turbine generator described above is applied to at least one of the plurality of wind turbine generators.

According to the present invention, there is exerted an effect that active power can be controlled according to the request of a utility grid.

BRIEF DESCRIPTION OF DRAWINGS

FIG. 2 Functional block diagram showing an example of an active power control unit.

EXPLANATION OF REFERENCE

Figure 1:
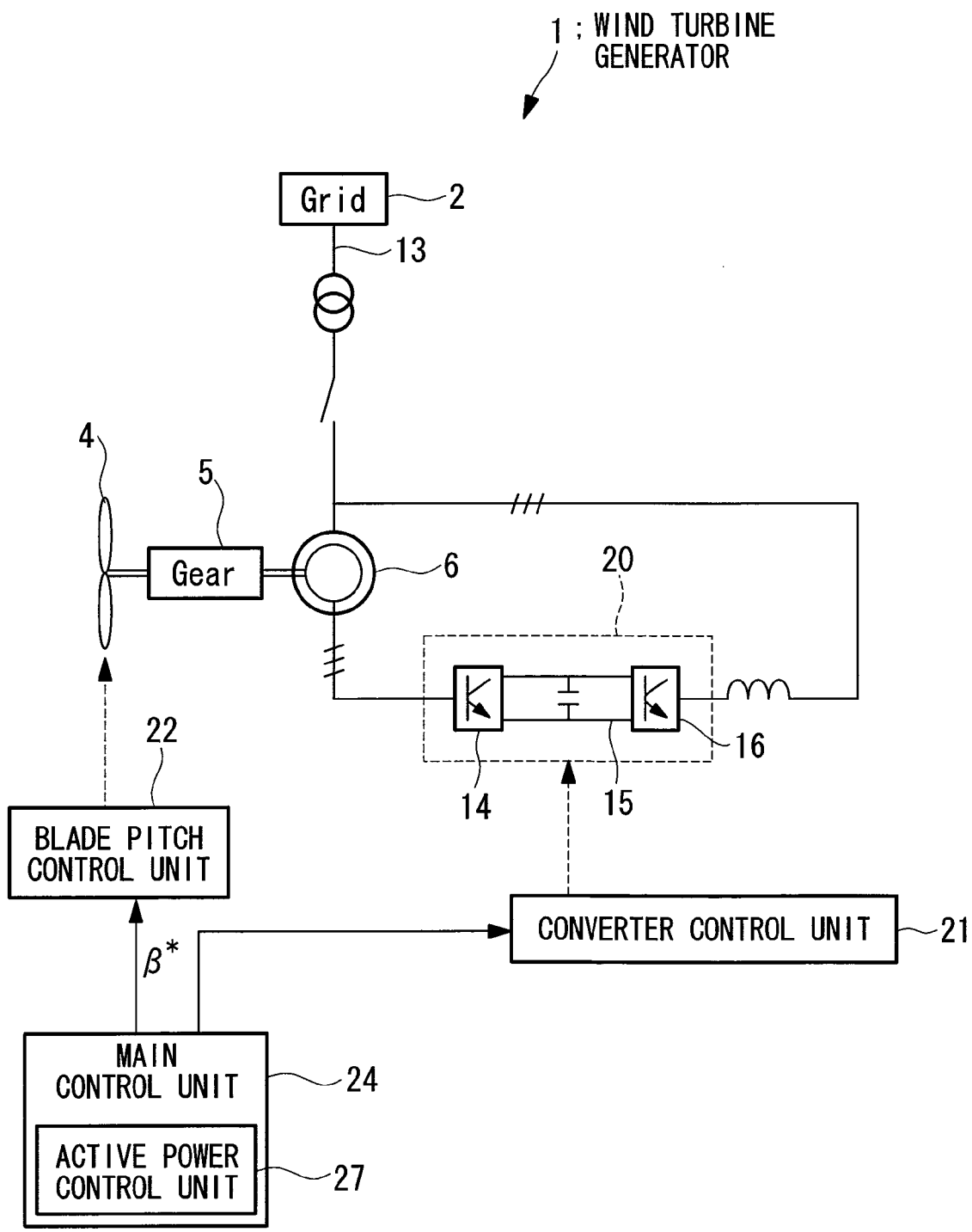
FIG. 1 Block diagram showing an example of a wind turbine generator according to an embodiment of the present invention.

1: wind turbine generator
2: utility grid
20: power converting unit
21: converter control unit
27: active power control unit
50: rotor speed detecting unit
51: demand value obtaining unit
52: changing unit
53: power demand value arithmetic unit

BEST MODE FOR CARRYING OUT THE INVENTION

An embodiment of a wind turbine generator and a method of controlling the same according to the present invention will be described below with reference to the drawings.

FIG. 1 is a block diagram showing an example of the configuration of a power generator 6 provided in a wind turbine generator 1 and its periphery.

As shown in FIG. 1, the wind turbine generator 1 includes wind turbine blades 4, a gear 5, the power generator 6, a power converting unit 20, a converter control unit 21, a blade control unit 22, and a main control unit 24. The power generator 6 and a utility grid 2 are connected to each other. A rotor of the power generator 6 is joined to a wind turbine rotor (not shown) via the gear 5.

In the periphery of the power generator 6, there is provided a rotor speed detecting unit (detecting unit) 50 for detecting the rotor speed of the power generator 6. The rotor speed detected by the rotor speed detecting unit 50 is outputted to the main control unit which will be described later.

In the present embodiment, the power generator (induction machine) 6 is constructed so as to be able to output power generated by the power generator 6 to the utility grid 2 from both of a stator winding and a rotor winding. Concretely, the stator winding of the power generator 6 is connected to the utility grid 2, and the rotor winding is connected to the utility grid 2 via the power converting unit 20.

The power converting unit 20 has a converter 14, a DC bus 15, and an inverter 16, and converts AC power received from the rotor winding to AC power adapted to the frequency of the utility grid 2. The converter 14 converts AC power generated in the rotor winding to DC power and outputs the DC power to the DC bus 15. The inverter 16 converts the DC power received from the DC bus 15 to AC power having the same frequency as that of the utility grid 2, and outputs the AC power.

The power converting unit 20 also has the function of converting the AC power received from the utility grid 2 to AC power adapted to the frequency of the rotor winding. In this case, the inverter 16 converts the AC power to DC power and outputs the DC power to the DC bus 15. The converter 14 converts the DC power received from the DC bus 15 to AC power adapted to the frequency of the rotor winding, and supplies the AC power to the rotor winding of the power generator 6.

The main control unit 24 has an active power control unit 27. The active power control unit 27 has, as shown in FIG. 2, the rotor speed detecting unit 50, a demand value obtaining unit 51, a changing unit 52, and a power demand value arithmetic unit 53.

The rotor speed detecting unit 50 detects, as a parameter in the operation state of the wind turbine generator 1, a rotor speed of the power generator 6, and outputs it to the demand value obtaining unit 51.

The demand value obtaining unit 51 has, as shown in FIG. 2, first information in which a rotor speed (operation state parameter) and a target value of active power (hereinbelow, called "active power demand value") supplied to the utility grid 2 are associated with each other, obtains an active power demand value corresponding to the rotor speed detected by the rotor speed detecting unit 50 by using the first information, and outputs the active power demand value to the blade control unit 22 and the power demand value arithmetic unit 53. In the first information, the maximum active power value is set to a rated value P0. In a region where the rotor speed has a predetermined value or more, the rated value is outputted as the active power demand value.

The changing unit 52 changes the maximum value of the active power demand value in the first information, at a predetermined change rate or less, which is referred to by the demand value obtaining unit 51 in a case where a request for changing the maximum value of active power is received from the utility grid 2 side for the purpose of suppressing power fluctuations, improving transient stability, or the like. For example, the changing unit 52 preliminarily stores information on an upper limit value "a" of the change rate and time T required to change the first information, and determines the change rate within this range.

Concretely, in a case where the rated value of the present active power is denoted by P0 and the maximum value of newly defined active power is denoted by P1, the changing unit 52 calculates a change rate (b=(P1−P0)/T) by dividing the difference (P1−P0) between the active power rated value P0 and the maximum value P1 of the newly defined active power by time T (for example, five minutes) required for such a change. The changing unit 52 employs a calculated change rate "b" in a case where the calculated change rate "b" is equal to or less than the upper limit value "a" of the preset change rate, while employing the upper limit value "a" in a case where the calculated change rate "b" exceeds the upper limit value "a". The change rate is not limited to this example but can be arbitrarily set by design.

With respect to the change rate of the changing unit 52 according to the present embodiment, as the time T required for the change, preliminarily-determined time (for example, five minutes) is employed. However, the present invention is not limited to such predetermined time. For example, in a case of receiving time T' together with a request for changing the maximum value of active power, the changing unit 52 employs the received time T' as time information for calculating the change rate "b", and the change rate "b" is calculated by b=(P1−P0)/T'. Further, in the case where the calculated change rate "b" is equal to or less than the preset predetermined change rate "a", the calculated change rate "b" is employed. In the case where the calculated change rate "b" exceeds the predetermined change rate "a" which is preset, the predetermined change rate "a" is employed. As described above, time required to change the maximum value of active power may be arbitrarily set.

When obtaining the rotor speed in a period in which the first information is changed by the changing unit 52, the demand value obtaining unit 51 reads the active power demand value from the first information which is being changed, and outputs it.

The active power demand value output from the demand value obtaining unit 51 is inputted to the blade control unit 22 and also inputted to the power demand value arithmetic unit 53.

The power demand value arithmetic unit 53 calculates a reactive power demand value to be outputted to the utility grid 2 based on the active power demand value outputted from the demand value obtaining unit 51 and a power factor demand value. The power factor demand value is a value obtained by controlling case of the phase difference θ [rad] of voltage and current as a power factor so as to be a power factor required by the utility grid. More concretely, in a case where U denotes an effective value of voltage and I denotes an effective value of current, apparent power S=UI [VA], effective power P=UI cos θ [W], and reactive power Q=UI sin θ [var]. In this case, it is known that the following equation (1) is satisfied among the apparent power S, the active power P, and the reactive power Q. Based on the equation, the reactive power is calculated, and the calculated reactive power is used as a reactive power demand value.

$$S^2 = P^2 + Q^2 \qquad (1).$$

The power demand value arithmetic unit 53 outputs the reactive power demand value and the active power demand value obtained from the demand value obtaining unit 51 to the converter control unit 21 (refer to FIG. 1).

The converter control unit 21 generates a PWM (Pulse Width Modulation) signal based on the active power demand value and the reactive power demand value obtained from the active power control unit 27, and provides the PWM signal to the converter 14 and the inverter 16. Consequently, the active power and the reactive power according to the active power demand value and the reactive power demand value, respectively, provided from the active power control unit 27, are supplied to the utility grid 2.

The blade control unit 22 generates a pitch angle demand value β* based on the active power demand value received from the active power control unit 27 in the main control unit 24 and the rotor speed, and controls the pitch angle of the wind turbine blade 4 so that an actual pitch angle β coincides with the pitch angle demand value β*.

Next, the action of the wind turbine generator 1 according to the present embodiment will be described.

First, the rotor speed of the wind turbine generator 1 is detected by the rotor speed detecting unit 50 at predetermined time intervals, and the detection value is provided to the active power control unit 27 in the main control unit 24. In the active power control unit 27, the active power demand value corresponding to the rotor speed is obtained from the first information by the demand value obtaining unit 51, and the obtained active power demand value is provided to the blade control unit 22 and the power demand value arithmetic unit 53.

In the blade control unit 22, the pitch angle demand value β* corresponding to the active power demand value is obtained, and the blade pitch angle is controlled based on the pitch angle demand value β*. On the other hand, in the power demand value arithmetic unit 53, the reactive power demand value is calculated based on the inputted active power demand value and the power factor demand value, and these demand values are provided to the converter control unit 21. The converter control unit 21 controls the power converting unit 20 based on the provided active power demand value and reactive power demand value. As a result, the active power and the reactive power according to the active power demand value and the reactive power demand value are supplied to the utility grid 2.

In a case of repeatedly performing such a control, when a request for changing the maximum value of the active power and the maximum value P1 of the newly defined active power are received from the utility grid 2 side, the first information is changed by the changing unit 52 so that the rated value P0 of the active power in the present first information becomes the maximum value P1 of the active power newly defined.

Concretely, the changing unit 52 gradually changes the rated value P0 in the first information to the maximum value P1 of the newly defined active power at the predetermined change rate. In the transient period of the first information, using the first information being changed, an active power demand value corresponding to the rotor speed detected by the rotor speed detecting unit 50 is obtained by the demand value obtaining unit 51, and the obtained active power demand value is provided to the blade control unit 22 and the power demand value arithmetic unit 53. Accordingly, the active power demand value can be prevented from rapidly increasing/decreasing. As a result, the amount of active power supplied to the utility grid 2 can be gently changed to the maximum value of the active power newly defined.

After the change of the first information by the changing unit 52 is completed, that is, when the rated value of the first information reaches the newly defined maximum value P1 of the active power, control of the active power value based on the changed first information is performed until a demand of changing the maximum value of active power is received again.

In the wind turbine generator 1 and the method of controlling the same according to the present embodiment, the changing unit 52 gradually changes the maximum value of the active power demand value of the first information which is set to the rated value to the newly defined maximum value of active power at a predetermined change rate, so that the active power demand value can be prevented from being rapidly changed in response to a request for changing the maximum value of active power. As a result, by setting the predetermined change rate to a change rate to suppress fluctuations in the voltage value or frequency fluctuations of the utility grid to a predetermined value or less, a rapid change of the maximum value of the active power demand value which is set to the rated value can be prevented, and the frequency fluctuation or power fluctuation in the utility grid can be suppressed to the predetermined value or less.

Although the speed of the rotor is defined as the operation state parameter detected by the rotor speed detecting unit 50 (detecting unit) in the present embodiment, the present invention is not limited thereto. For example, as the operation state parameter detected by the detecting unit, excitation current of the rotor may be used in place of the speed of the rotor.

Modification 1

In a case where the changing unit 52 according to the present embodiment changes the maximum value of active power at a predetermined change rate or less, a change rate "b" is calculated based on the difference (P0−P1) between the active power maximum value before the change and the active power maximum value after the change and time T taken for the change, and the maximum value is changed at the change rate "b" equal to or less than the predetermined change rate "a". However, the present invention is not limited to the present embodiment. For example, it is alternatively possible to specify a change rate equal to or less than the predetermined change rate "a", that is, a change amount of the active power per unit time, and change the maximum value of active power based on the specified change rate.

Modification 2

In the present embodiment, the changing unit 52 changes the maximum value of the active power demand value of the first information held by the demand value obtaining unit 51 to the newly defined maximum value of active power at a predetermined change rate specified or less. The present invention, however, is not limited to the present embodiment. For example, the changing unit 52 may have a plurality of pieces of second information in which the maximum values of the active power demand values are set as values different from the rated value P0 of the first information and, in a case where a request to change the maximum value of active power is received from the utility grid side, the active power demand value may be gradually changed by using the plurality of pieces of second information.

For example, the changing unit 52 may change the active power demand value step by step by extracting, from the plurality of pieces of second information, a plurality of pieces of second information in which the maximum value of the active power demand value is between the rated value P0 of the first information and the newly defined maximum value of active power, and employing in order, out of the extracted second information, from second information having the maximum value of the active power demand value close to the rated value P0 to second information having the maximum value of active power demand value close to the newly defined maximum value of active power.

As described above, the second information preliminarily held in the changing unit 52 is outputted to the demand value obtaining unit 51, and the demand value obtaining unit 51 outputs the active power demand value based on the second information. Therefore, the active power demand value can be promptly outputted to the power demand value arithmetic unit 53.

In a case where the changing unit 52 according to the present embodiment changes the active power demand value in the first information, which is set to the rated value, to the newly defined maximum value of active power, it is sufficient that the maximum value of the active power demand value before the change coincides with the maximum value of active power newly defined in the end. The method of changing an active power demand value other than the maximum value is not specifically limited. For example, in a case where the first information is expressed in a graph as shown in FIG. 2, the graph may be reduced without changing the shape of the graph and the maximum value of the active power demand value may be made coincide with the newly defined maximum value, or the active power demand value of the first information before the change may be used as it is as the active power demand value other than the maximum value of the active power demand value. Such a method of changing the characteristic of the first information is based on a predetermined algorithm.

Although the first information is expressed in the graph in the present embodiment, the first information is not limited thereto. Concretely, it is sufficient that the operation state parameter and the active power demand value are associated with each other. For example, the first information may be provided in the form of a mathematical expression or a table.

The invention claimed is:

1. A wind turbine generator, comprising:
at least one wind turbine blade;
a power generator connected to the wind turbine blade and configured to generate power from a rotational force of the wind turbine blade, the power generator being connected to a utility grid to output the power to the utility grid; and
a control unit configured to perform an interconnected operation with the utility grid, the control unit including:
a detecting unit for detecting an operation state parameter related to an operation state of the power generator;
a demand value obtaining unit that stores therein first information containing (i) a relation between the operation state parameter and active power demand value and (ii) a maximum value of an active power set to a rated value, the demand value obtaining unit configured to receive the operation state parameter from the detecting unit and to obtain an active power demand value corresponding to the operation state parameter detected by the detecting unit from the first information; and
a changing unit configured to
receive a request for changing the maximum value of the active power and a newly defined maximum value of the active power from the utility grid, and
change the maximum value of the active power in the first information to the newly defined maximum value of the active power at a change rate determined based on the maximum value of the active power in the first information and the newly defined maximum value of the active power received from the utility grid.

2. The wind turbine generator according to claim 1, wherein the changing unit stores therein an upper limit of the change rate and a time required for changing the maximum value of the active power in the first information to the newly defined maximum value of the active power received from the utility grid, and is configured to calculate the change rate by dividing a difference between the maximum value of the active power in the first information and the newly defined maximum value of the active power received from the utility grid by the time, to employ the calculated change rate as the change rate in a case where the calculated change rate is equal to or less than the upper limit, and to employ the upper limit of the change rate as the change rate in a case where the calculated change rate exceeds the upper limit.

3. The wind turbine generator according to claim 1, wherein
the changing unit stores therein a plurality of pieces of second information each containing the relation between the operation state parameter and active power demand value and a different maximum value of the active power between the maximum value of the active power set to the rated value and the newly defined maximum value of active power, and upon receiving the request for changing the maximum value of the active power and the newly defined maximum value of the active power from the utility grid, is configured to change the maximum value of the active power in the first information to the newly defined maximum value of the active power step by step by using the plurality of pieces of second information.

4. A wind farm comprising a plurality of wind turbine generators, wherein at least one of the plurality of wind turbine generators is the wind turbine generator according to claim 1.

5. The wind turbine generator according to claim 1, wherein the operation state parameter is at least one of rotation speed of a rotor of the power generator or an excitation current of the rotor.

6. A method of controlling a wind turbine generator including a wind turbine blade, a power generator connected to the wind turbine blade and configured to generate power from a rotational force of the wind turbine blade, the power generator being connected to a utility grid to output the power to the utility grid, and a control unit for controlling the wind turbine blade and the power generator, the method being performed by the control unit, the method comprising:
detecting an operation state parameter related to an operation state of the power generator;
storing first information containing a relation between the operation state parameter and active power demand value and a maximum value of the active power set to a rated value;
obtaining an active power demand value corresponding to the operation state parameter detected in the detecting from the first information;
receiving a request for changing the maximum value of the active power and a newly defined maximum value of the active power from the utility grid; and
changing the maximum value of the active power in the first information to the newly defined maximum value of the active power at a change rate determined based on the maximum value of the active power in the first information and the newly defined maximum value of the active power received from the utility grid.

7. A method of controlling a wind farm having a plurality of wind turbine generators, wherein the method of controlling a wind turbine generator according to claim 6 is applied to at least one of the plurality of wind turbine generators.

8. The method according to claim 6, further comprising:
storing an upper limit of the change rate and a time required for changing the maximum value of the active power in the first information to the newly defined maximum value of the active power received from the utility grid, wherein
the changing includes
calculating the change rate by dividing a difference between the maximum value of the active power in the first information and the newly defined maximum value of the active power received from the utility grid the time,
employing a calculated change rate as the change rate in a case where the calculated change rate is equal to or less than the upper limit, and
employing the upper limit of the change rate as the change rate in a case where the calculated change rate exceeds the upper limit.

9. The method according to claim 6, further comprising:
storing a plurality of pieces of second information each containing the relation between operation state parameter and active power demand value and a different maximum value of the active power between the maximum value of the active power set to the rated value and the newly defined maximum value of active power, wherein
the changing includes changing the maximum value of the active power in the first information to the newly defined maximum value of the active power step by step by using the plurality of pieces of second information.

10. The method according to claim 6, wherein the operation state parameter is at least one of rotation speed of a rotor of the power generator or an excitation current of the rotor.

* * * * *